US006458235B1

United States Patent
Beentjes et al.

(10) Patent No.: US 6,458,235 B1
(45) Date of Patent: Oct. 1, 2002

(54) METHOD OF COATING A METALLIC SUBSTRATE WITH THERMOPLASTIC COATING MATERIAL

(75) Inventors: Petrus Cornelis Jozef Beentjes, Castricum; Willem Jan Van Veenen, Amsterdam, both of (NL)

(73) Assignee: Corus Staal BV, Ca Ijmuiden (NL)

( * ) Notice: Subject to any disclaimer, the term of this patent is extended or adjusted under 35 U.S.C. 154(b) by 0 days.

(21) Appl. No.: 09/423,708

(22) PCT Filed: May 14, 1998

(86) PCT No.: PCT/EP98/03001

§ 371 (c)(1),
(2), (4) Date: Mar. 14, 2000

(87) PCT Pub. No.: WO98/52750

PCT Pub. Date: Apr. 26, 1998

(30) Foreign Application Priority Data

May 22, 1997  (NL) ............................................. 1006109

(51) Int. Cl.[7] ......................... B29C 47/06; B32B 31/30; B32B 15/08
(52) U.S. Cl. ........................... 156/244.23; 156/244.26; 156/244.27; 156/308.2; 156/322; 156/324
(58) Field of Search ....................... 156/244.11, 244.23, 156/244.26, 244.27, 272.6, 497, 324, 322, 308.2

(56) References Cited

U.S. PATENT DOCUMENTS 4,370,187 A  * 1/1983  Katagiri et al. ........ 156/244.23
4,519,863 A  5/1985  Landgraf et al. ...... 156/244.12

(List continued on next page.)

FOREIGN PATENT DOCUMENTS

DE  19529583  2/1997
EP  0067060  12/1982

(List continued on next page.)

OTHER PUBLICATIONS

Patent Abstracts of Japan, vol. 017, No. 336, Jun. 25, 1993 for JP 05042650 published Feb. 23, 1993.

(List continued on next page.)

*Primary Examiner*—Michael W. Ball
*Assistant Examiner*—Todd J. Kilkenny
(74) *Attorney, Agent, or Firm*—Stevens, Davis, Miller & Mosher, LLP

(57) ABSTRACT

Method of coating a metallic substrate (1) with thermoplastic coating material, comprising a preheating the substrate in such as way that, just prior to coating, it is at a temperature between 70° C. and 150° C., preferably between 100° C. and 130° C. in the case of a coating containing polypropene and between 80 and 110° C. in the case of a coating containing polyethene; coextrusion, in the first coating station of a sheet (6) comprising a polyolefin covering layer and a modified polyolefin adhesion layer; coating of the substrate (1) with a molten sheet in the presence of ozone by pressing it with the adhesion layer against the surface of the substrate; transportation of the strip (9) coated on one side to a second coating station and heating the strip so that, just before coating, the strip is at a temperature between 70° C. and 130° C., preferably between 80° C. and 120° C., if the coating layer applied in the first coating station is polypropene and between 80 and 110° C. if the coating layer applied at that point is polyethene; coating of the substrate with a molten sheet extruded in the second coating station by pressing it against the uncoated surface of the substrate, use being made of the presence of ozone; heating of the coated substrate so that it assumes a temperature which is above the melting point of the polyolefins applied; cooling of the coated substrate.

30 Claims, 1 Drawing Sheet

U.S. PATENT DOCUMENTS 4,980,210 A * 12/1990 Heyes ........................ 428/35.9
6,083,336 A * 7/2000 Kiriazis ................... 156/272.6

FOREIGN PATENT DOCUMENTS

| EP | 0312308 | | 4/1989 | |
| JP | 5-42650 | * | 2/1993 | ........... B32B/31/30 |
| WO | 9632202 | | 10/1996 | |

OTHER PUBLICATIONS

Patent Abstracts of Japan, vol. 095, No. 011, Dec. 26, 1995 for JP 07227932 published Aug. 29, 1995.

Patent Abstracts of Japan, vol. 007, No. 024, Jan. 29, 1983 for JP 57178832 published Nov. 4, 1982.

Patent Abstracts of Japan, vol. 017, No. 248, May 18, 1993 for JP 04368845 published Dec. 21, 1992.

* cited by examiner

METHOD OF COATING A METALLIC SUBSTRATE WITH THERMOPLASTIC COATING MATERIAL

FIELD OF THE INVENTION

The invention relates to a method of coating a metallic substrate with thermoplastic coating material.

BACKGROUND OF THE INVENTION

In connection with this application, thermoplastic materials must also be understood to mean plastic materials which are composed essentially of thermoplastics and furthermore of additives which are added to obtain particular properties.

The coating of metallic substrates with plastic layers is known in practice and is suitable, in particular, where the metal used has to be protected against atmospheric, generally corrosive, conditions or where the environment has to remain safeguarded from undesirable action of the metal or where both the abovementioned effects have to be avoided, such as in the case of packagings. Certain foodstuff cans, for example, have long been manufactured from tinned packaging steel, also called tinplate, provided on one side with a plastic layer in order to prevent the metal from entering the foodstuff and from rusting through occurring as a consequence of corrosive action of the foodstuff and, on the other hand, to preserve the fine appearance of the packaging for a sufficiently long time.

These coating layers, which are usually organic, are generally applied by lacquering. It may be necessary to apply different covering layers for the inside and outside of the lid. The covering layer on the inside must primarily offer a good corrosion protection against the respective product to be preserved and to be packaged, while, on the outside, the appearance, for example, the gloss and the colour, and mechanical resistance to scratching and impacts are of importance.

A machining step in the creation formation of a packaging, such as the folding of body and lid in the case of a foodstuff can or drink can, may give rise, for example, to the imposition of more detailed requirements on the covering layer. It is of importance that the covering layer on the outside is both scratch-resistant and readily deformable so that the folding operation is withstood without damage.

To apply an organic top coat, apart from lacquering of the partly finished packaging, it is also conceivable to carry out the coating at an earlier stage in the production chain in the form of a coil-coating process, for example coil lacquering, foil film coating (also referred to as coil laminating), in which a plastic film is applied to a substrate, and extrusion coating, a form of film coating in which the film is not supplied from elsewhere, but, as it were, is produced by extrusion at the point which is being coated and applied to a substrate.

Any method of coating has its own disadvantages, be it in the nature of the coating material or in the nature of the manner of coating. It is clear that the drawback of evaporation of solvents applies to lacquering, which is even a very great drawback if the solvents contain VOCs (=volatile organic compounds), which is the case for many applications.

Film coating is generally not regarded as an economically feasible alternative. The production of the film, rolling it up, transporting it and unrolling it again result, when taken together, in an alternative which does not compete with lacquering.

The extrusion coating process as a method of application is attractive because it does not have the abovementioned economic disadvantage, but it proves difficult to carry out in the case of certain combinations. This applies mainly to single-sided or double-sided coating with polyolefins. Said polyolefins do not inherently have the properties which are necessary for good adhesion to metal substrates. For this reason polyolefin coating layers are usually chosen which are provided with a modified adhesion layer. Said adhesion layer is then composed of polyolefins modified with carboxylic acid groups or anhydride groups. Suitable adhesion layers based on polyolefins can be produced, for example, by copolymerization of propene or ethene or a combination of the last two with α-unsaturated carboxylic acids, β-unsaturated carboxylic acids, the associated anhydrides or associated esters or half-esters. Examples of these are acrylic acid, methacrylic acid, crotonic acid, cinnamic acid, maleic acid, maleic anhydride, fumaric acid and the like. The percentage by weight of such modifying monomers is normally between 1 and 15%.

Such adhesion-promoting monomers are capable of binding to the substrate surface but do so only if the polyolefin adhesion layer is at a temperature above the melting point for some time, as a result of which diffusion of the adhesion-promoting monomers through the polyolefin to the substrate surface becomes possible and the adhesion-promoting monomer may react chemically or physically with the substrate surface. It is found to be impossible to bring about adequate adhesion for further transportation of the product through the line by means of extrusion of a polyolefin provided with adhesion-promoting monomers onto a metal substrate which is brought to a temperature which is below the melting point of the respective polyolefin. Instead of that, the film follows the track of the internally cooled metal pressure roller which presses the coating layer onto the substrate and the film is rolled up onto the pressure roller. Preheating the metal strip to a temperature above the melting point of the polyolefin is, of course, very readily possible. This results in an adhesion between the modified polyolefin coating layer and the metal strip. However, if the other side of the strip has also to be coated and this does not take place at the same time as the coating of the abovementioned side, the problem arises that the coating layer of the abovementioned side is damaged during the step of coating the other side because the temperature of the product is, after all, above the melting point of the polyolefin coating layer. As a result, the coating layer comes into contact with the steel pressure roller in the molten and, consequently, very fragile state and is damaged.

In regard to the modification of the plastic film, such as, for example, by means of oxidation of the surface by a corona treatment, extrusion at very high temperature or a flame treatment, it may be pointed out that these are generally not readily feasible for the in situ modification of a molten, very thin sheet of plastic. A corona treatment ensures the production of an electrostatic charge, as a result of which the molten sheet is repelled from the corona installation and the treatment loses its effectiveness. In the case of extrusion of the polyolefin at very high temperature, the free surface of the coating layer oxidizes, resulting in the packaging material having an increased effect on the taste of the filling agent; a flame treatment is accompanied by a gas flow which repels the molten sheet of plastic and, in addition, develops a fairly large amount of heat around the mouth of the gun head.

SUMMARY OF THE INVENTION

Surprisingly, modification can in fact be carried out successfully by making use of a very small amount of ozone gas, which oxidizes the surface of the sheet of molten polyolefin in such a way that some adhesion to a substrate which is at a preheating temperature lower than the melting point of the polyolefin is produced even in the laminating nip. This in-situ adhesion is found to be adequate for the coating layer to follow the substrate and, consequently, not the internally cooled pressure roller, to the afterheating section, where further adhesion improvement takes place by afterheating to a temperature above the melting point of the polyolefin, followed by diffusion of the adhesion-promoting groups to the substrate surface and further chemical or physical reactions.

It is furthermore found that copolymerization of propene with ethene has the result that the action of the ozone gas is improved, as a result of which the initial adhesion of the coating layer to the substrate increases.

DETAILED DESCRIPTION OF THE INVENTION

Figure 1:
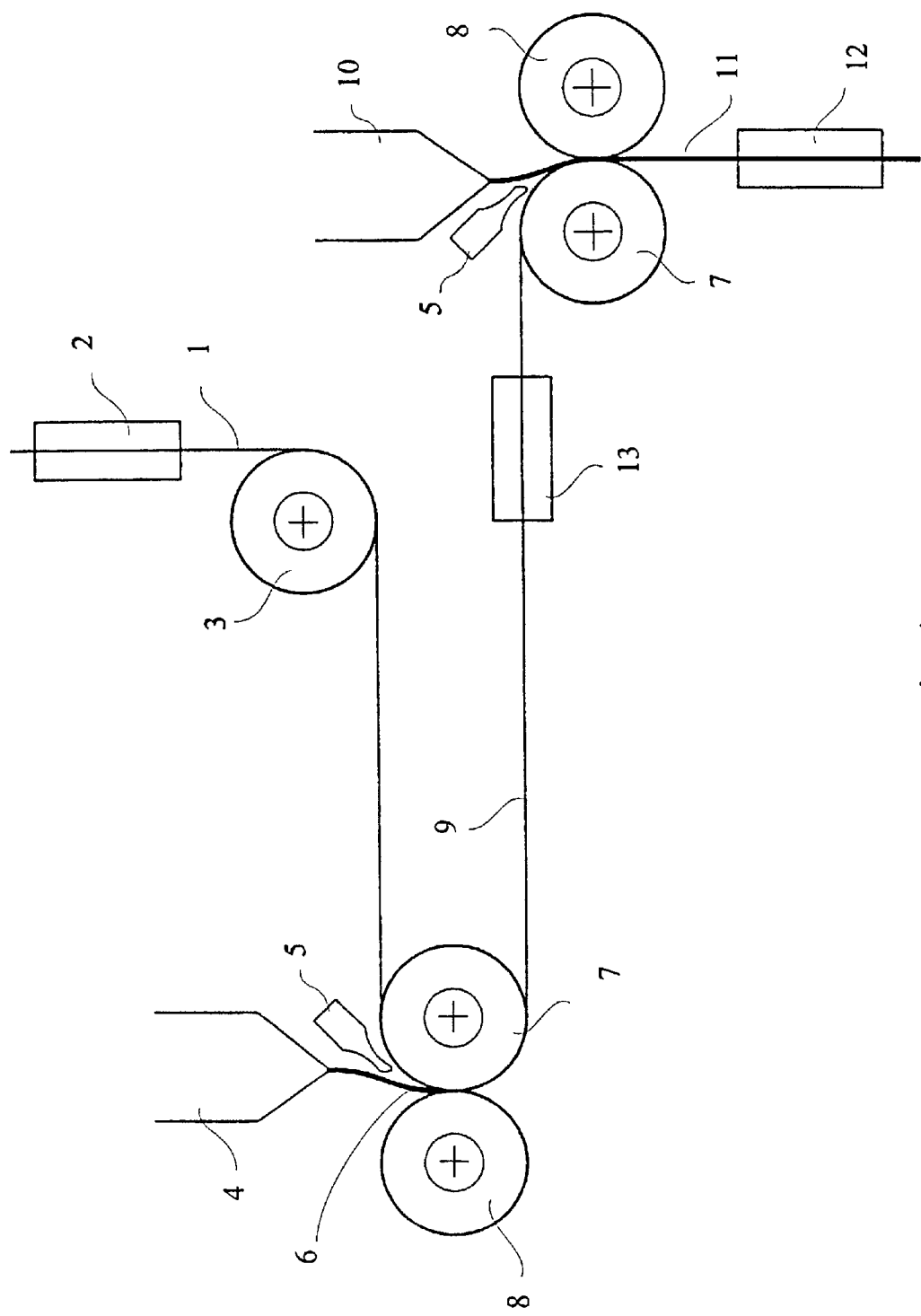
FIG. 1 show a device for carrying out the method of the invention.

The method according to the invention now comprises:
preheating of the substrate in such a way that, just prior to coating, it is at a temperature between 70° C. and 150° C., preferably between 100° C. and 130° C. in the case of a coating containing polypropene and between 80 and 110° C. in the case of a single-sided or double-sided coating containing polyethene;

coextrusion, in a first coating station of a sheet comprising a polyolefin covering layer and a modified polyolefin adhesion layer;

coating of the substrate with a molten sheet in the presence of ozone by pressing it with the adhesion layer against the surface of the substrate;

transportation of the strip coated on one side to a second coating station and heating the strip so that, just before coating, the strip is at a temperature between 70° C. and 130° C., preferably between 80° C. and 120° C., if the coating layer applied in the first coating station is polypropene, and between 80 and 110° C., if the coating layer applied at that point is polyethene;

coating of the substrate with a molten sheet extruded in the second coating station by pressing it against the uncoated surface of the substrate, use being made of the presence of ozone;

heating of the coated substrate so that it assumes a temperature which is above the melting point of the polyolefin applied;

cooling of the coated substrate.

An alternative method according to the invention comprises:
preheating the substrate in such a way that, just prior to coating in a first coating station, it is at a temperature between 70° C. and 150° C., preferably between 100° C. and 130° C.;

extrusion, in the first coating station, of a molten sheet of polyester composed of one or more layers of polyester;

coating of the substrate by pressing the molten sheet against a surface of the substrate;

transportation of the strip coated on one side with polyester to a second coating station and heating the strip so that, before coating, it is at a temperature between 70° C. and 130° C., preferably between 90° C. and 120° C.;

coextrusion, in a second coating station, of a sheet comprising a polyolefin top layer and a modified polyolefin adhesion layer;

coating of the substrate with the molten sheet in the presence of ozone by pressing it with the adhesion layer against the surface of the substrate;

heating the coated substrate so that it assumes a temperature which is above the melting point of the polyolefin applied;

cooling of the coated substrate.

As a result of a suitable cooling treatment, for example preferably by quenching in water, the thermoplastic coating layer remains as amorphous as possible in the case of a polyester as coating layer, or particularly monocrystalline in the case of a polyolefin as coating layer. A coated substrate produced in this way is capable of withstanding deformations, for example as a consequence of folding treatment, well. Recrystallization does in fact occur again to a certain degree as a result of heating at a later point in time, for example in connection with sterilization; however, this does not then constitute a disadvantage but, on the contrary, an advantage. As a result of recrystallization, the crystallinity and, consequently, the hardness of the covering layer increases.

It may be beneficial to add LDPE to the thermoplastic material at preferably 5–20% by weight. This results in a better workability of the molten sheet, with improved initial adherence after ozone treatment.

According to the invention, a metallic substrate coated with a thermoplastic material is obtained, in which the thickness of the substrate is 0.05–0.30 mm and the thickness of the thermoplastic coating layer is 3–50 $\mu$m.

The plastic layer is applied, for example, with an extruder, with which a multilayer system may also be applied.

Polyolefins such as PP and PE are applied in molten form to a metal substrate, for example as shown in FIG. 1. The distance of the lips of the nozzle from the nip between two rollers is between 4 and 25 cm, preferably between 8 and 20 cm. Such a method of application is possible for plastics having a fairly low melt strength, such as polyesters, only at a low stretch ratio, that is to say low strip speed.

The ozone is concentrated between the molten sheet and the substrate. The outlet opening of the application system is directed towards the molten sheet. As a result of the extremely small amount of gas which is necessary, the web of the molten sheet is not disturbed.

As a result of the method of application and in conjunction with the heat treatment, it is preferable, wherever possible, for the thickness of substrate and coating layer to be within the specified ranges.

Preferably, the thickness of the thermoplastic coating layer varies in the range from 3 to 20 $\mu$m. The molten sheet is already thin and, as a result of the correct feed rate in combination with a suitable substrate speed, can still be thinned down into the specified range as a consequence of uniaxial stretching. From the point of view of material consumption, as thin a plastic layer as possible is desirable. From a functional point of view, however, a higher lower limit than 3 $\mu$m may apply, depending on the application. The metallic substrate may be essentially iron-containing, for example steel. This is a cheap and attractive material with a view to reusability (possibility of recycling). Furthermore, an essentially iron-containing substrate can readily be heated by means of induction and the temperatures used in the present method do not have any appreciable effect on the mechanical properties of the substrate. For good adhesion, a packaging steel of the ECCS type is suitable.

A packaging steel coated with a thermoplastic material containing essentially PP is, for example, particularly suitable for so-called lid applications. From test results on cans stored in conditioned rooms, manufactured with material according to the invention and filled with foodstuffs, it is found that very good results are achieved with lid material of packaging steel according to the invention provided with a PP coating layer. The material produced in this way is found both to have good corrosion resistance and to be scratch-resistant, so that the same layer can be used both inside and outside the foodstuffs can, i.e. in a double-sided manner on the starting material. Coated material can also be processed without difficulty in the manner disclosed.

EXEMPLARY EMBODIMENT 1

The application of a PP covering layer to both sides of the strip proceeds, for example, as follows:

- an already chromium-plated steel substrate (ECCS= electrolytically chrome-coated steel) is preheated to 130° C.;
- the heated substrate is passed through a coating nip formed by a rubber pressure roller and a polished, cooled roller;
- in said nip, a sheet of molten PP having a width which is 10 to 40 mm greater than the width of the substrate and composed of the adhesion layer, which comes into contact with the substrate, and the top layer, the top layer being thicker than the adhesion layer, is applied to the substrate from a system comprising two extruders, the plastic flows emerging from which are combined in a coextrusion die head;
- an amount of ozone gas is directed at the molten sheet and, specifically, as low as possible, just in front of the nip so that the percentage of fresh surface is a maximum at that point. An amount of 8 mg/ozone per $m^2$ is adequate;
- the laminate of ECCS and PP formed is cooled only over the contact length of the nip by the polished cooling roller so that the PP layer applied assumes the roughness of the cooling roller but the temperature of the laminate falls by only a small amount;
- the oxidation of the polyolefin surface in contact with the steel substrate ensures that the coating layer adheres sufficiently to the steel substrate for it to be able to peel off the internally cooled pressure roller;
- the substrate, which is now coated on one side, is brought in the same line section to a temperature of 120° C. and is also provided on the other side with a polyolefin plastic layer in the presence of ozone gas;
- still in the same line section, the strip coated on two sides is then heated by means of induction heating between 150° C. and 280° C., preferably between 180° C. and 225° C., kept at this temperature for 0.5 to 20 seconds and then very rapidly cooled in a water tank;
- this is followed by drying using wringer rollers or hot air;
- after the plastic layers have been applied to both sides of the strip and the adhesion has been maximized, the excess of plastic is removed at both edges of the strip by means of a suitable cutting technique, such as laser cutting or water cutting;
- finally, the coated strip is rolled up or cut into plates;
- from the packaging steel coated in the abovementioned manner, lids, for example, are produced in the usual way. These lids are then provided with a suitable compound in the usual manner. The compound applied is then dried in a convection oven under conditions such that the lids reach a temperature of 110 to 150° C., preferably of 110 to 120° C. The lids produced in this way are found to perform better than lids produced from ECCS having the same thickness and the same quality and provided on both sides with a 5-$g/m^2$ lacquer layer.

EXEMPLARY EMBODIMENT 2

As Exemplary Embodiment 1, but in this case a polypropene coating layer composed of a combination of a homopolymeric adhesion layer and a homopolymeric top layer and then a polyester coating layer is first applied:

- an already chromium-plated steel substrate (ECCS= electrolytically chrome-coated steel) is preheated to 130° C.;
- the heated substrate is passed through a coating nip formed by a rubber pressure roller and a polished, cooled roller;
- in said nip, a sheet of molten PP having a width which is 10 to 40 mm greater than the width of the substrate and composed of the adhesion layer, which comes into contact with the substrate, and the top layer, the top layer being thicker than the adhesion layer, is applied to the substrate from a system comprising two extruders, the plastic flows emerging from which are combined in a coextrusion die head;
- an amount of 8 mg/ozone per $m^2$ of ozone gas is directed at the molten sheet and, specifically, as low as possible, just in front of the nip so that the percentage of fresh surface is a maximum at that point;
- the laminate of ECCS and PP formed is cooled only over the contact length of the nip by the polished cooling roller so that the PP layer applied assumes the roughness of the cooling roller but the temperature of the laminate falls by only a small amount;
- the oxidation of the polyolefin surface in contact with the steel substrate ensures that the coating layer adheres just enough to the steel substrate to be able to peel off the internally cooled pressure roller;
- the substrate, which is now coated on one side, is brought in the same line section to a temperature of 120° C. and is also provided on the other side with a polyester coating layer;
- still in the same line section, the strip coated on two sides is then heated by means of induction heating between 150° C. and 280° C., preferably between 210° C. and 265° C., kept at this temperature for 0.5 to 20 seconds and then very rapidly cooled in a water tank;
- this is followed by drying using wringer rollers or hot air;
- after the plastic layers have been applied to both sides of the strip and the adhesion has been maximized, the excess of plastic is removed at both edges of the strip by means of a suitable cutting technique, such as laser cutting or water cutting;
- finally, the coated strip is rolled up or cut into plates.

EXEMPLARY EMBODIMENT 3

Instead of a homopolymeric adhesion layer, a copolymeric adhesion layer is now chosen which also contains a percentage of PE. Under exactly the same conditions, the adhesion is found to be very reliable and completely suitable for further processing immediately after the nip 1.

Comparison Example 1

As Example 1, but without ozone.

After applying the molten sheet in the nip, internally cooled steel pressure rollers are found to pull the polyolefin coating layer produced off the strip, regardless of the roughness of said rollers, as a result of which air comes between the substrate and the coating layer, even if the starting section of the coating layer is securely stuck to the substrate with tape. As a result of this penetration of air, a very uneven product which cannot be processed is produced in the afterheating oven.

Comparison Example 2

As Example 1, but the preheating temperature of the strip is now 200° C. and the ozone generator is switched off.

Depending on the thickness of the molten sheet, it adheres more or less well to the substrate after nip 1. A thickness of the molten sheet below 10 micrometres freezes very rapidly on the internally cooled pressure roller, as a result of which the diffusion of the adhesion-promoting groups quite quickly stops and the adhesion becomes moderate. Thicker coating layers do satisfactorily adhere. In the second nip, however, the temperature of the single-sided coated strip is still 150° C. and the polyolefin coating layer already applied in nip 1 is damaged. As a result, a very uneven product is produced.

The invention will now be explained in greater detail by reference to the drawing, in which:

FIG. 1 shows a device for carrying out the method according to the invention.

In FIG. 1, 1 is a metallic, strip-type substrate which is passed through, for example, an induction oven 2.

The substrate 1, which leaves the oven 2, for example, vertically, is passed round a deflection roller 3 to a first coating station which comprises an extrusion device 4, an ozone generator 5, a pressure roller 8, for example of steel, and a supporting roller 7, preferably provided with a rubber layer. The mouth of the ozone generator 5 is preferably situated as near as possible to the region where the substrate 1 and a sheet 6 emerging from the extrusion device 4 come together, just in front of the nip between supporting roller 7 and pressure roller 8.

After passing the first coating station, a single-sided coated substrate 2 is produced which is passed, possibly via an oven 13, to a second coating station. This station comprises a second extrusion device 10, a second ozone generator 5 and a supporting roller and pressure roller 7 and 8, respectively.

After the second coating, the double-sided coated substrate leaves the device via an oven 12.

Extgrusion device 4 is sitable for extruding a sheet 6 of polyolefin, for example PP or PE, provided with an adhesion layer or of polyester. The extrusion device 4 possibly comprises an extrusion device for polyolefins and one for polyester and the one chosen is employed. Extrusion device 10 is suitable for polyolefins. It is possible to interchange the positions of extrusion devices 4 and 10.

What is claimed is:

1. Method of coating a metallic iron-containing strip with thernmoplastic coating material, comprising:

preheating the strip to have, just prior to coating a first side of the strip, a temperature between 70° C. and 150° C.;

coextruding, in a first coating station a molten sheet comprising a polyolefin covering layer and a modified polyolefin adhesion layer;

coating the first side of the strip with the coextruded molten sheet in the presence of ozone by pressing the coextruded molten sheet with the adhesion layer against the surface of the strip to form a strip coated on one side with a coating having a thickness of 3 to 20 $\mu$m;

transporting the strip coated on one side to a second coating station and heating the strip to have a temperature, just prior to coating a second side of the strip, between 70° C. and 120° C.;

coating a second side of the substrate with a molten sheet comprising polyolefin extruded in the second coating station by pressing the extruded molten sheet against an uncoated surface of the substrate, in the presence of ozone to coat the second side with a coating having a thickness of 3 to 20 $\mu$m;

heating the twice coated strip to a temperature which is above the melting point of the polyolefin applied;

cooling the heated, twice coated strip.

2. Method of coating a metallic iron-containing strip with thermoplastic coating material, comprising:

preheating the strip to have, just prior to coating a first side of the strip, a temperature between 70° C. and 150° C.;

extruding, in the first coating station, a molten sheet comprising polyester composed of one or more layers comprising polyester;

coating the first side of the strip by pressing the extruded molten sheet against the first side of the strip to form a strip coated on one side with polyester coating having a thickness of 3 to 20 $\mu$m;

transporting the strip coated on one side to a second coating station and heating the strip to have a temperature, just prior to coating a second side of the strip, between 70° C. and 120° C.;

coextruding, in the second coating station, a sheet comprising a polyolefin top layer and a modified polyolefin adhesion layer;

coating a second side of the strip with the coextruded molten sheet in the presence of ozone by pressing the coextruded molten sheet with the adhesion layer against the second side of the strip to form a coating having a thickness of 3 to 20 $\mu$m;

heating the twice coated strip to a temperature which is above the melting point of the polyolefin applied;

cooling the heated, twice coated strip.

3. The method of claim 1, wherein the strip is preheated to have a temperature, just prior to coating in the first coating station, between 100° C. and 130° C. and the coextruded molten sheet applied in the first station comprises polypropene.

4. The method of claim 1, wherein the strip is preheated to have a temperature, just prior to coating in the first coating station, between 80 and 110° C. and the coextruded molten sheet applied in the first station comprises polyethene.

5. The method of claim 1, wherein just before coating in the second coating station, the strip is at a temperature between 80and 120° C., and wherein the coextruded molten sheet applied in the first coating station comprises polypropene.

6. The method of claim 1, wherein just before coating in the second coating station, the strip is at a temperature between 80° C. and 110° C., and wherein the coextruded molten sheet applied in the first coating station comprises polyethene.

7. The method of claim 2, wherein the strip is preheated such that, just prior to coating in the first coating station, the strip is at a temperature between 100° C. and 130° C.

8. The method of claim 2, wherein just before coating in the second coating station, the strip is at a temperature between 90° C. and 120° C.

9. Method of coating a metallic iron-containing strip with thermoplastic coating material, comprising:

preheating the strip to have, just prior to coating a first side of the strip, a temperature between 70° C. and 150° C.;

extruding, in the first coating station, a molten sheet comprising a member of the group consisting of a polyolefin and a polyester;

coating the first side of the strip with a molten sheet extruded in a first coating station by pressing the extruded molten sheet against an uncoated side of the strip, in the presence of ozone to form a strip coated on one side with the extruded sheet to form a coating having a thickness of 3 to 20 µm;

transporting the strip coated on one side with the extruded sheet to a second coating station and heating the strip to have a temperature, just prior to coating a second side of the strip, between 70° C. and 120° C.;

coextruding, in the second coating station a molten sheet comprising a polyolefin covering layer and a modified polyolefin adhesion layer;

coating the strip with the coextruded molten sheet in the presence of ozone by pressing the coextruded molten sheet with the adhesion layer against the second side of the strip to form a coating having a thickness of 3 to 20 µm;

heating the twice coated strip to a temperature which is above the melting point of the polyolefin applied;

cooling the heated, twice coated strip.

10. The method of claim 9, wherein the strip is heated to have a temperature, just prior to coating in the second coating station, between 100° C. and 120° C., and wherein the molten sheet applied in the second station comprises polypropene.

11. The method of claim 9, wherein the strip is heated to have a temperature, just prior to coating in the second coating station, between 80 and 110° C., and wherein the molten sheet applied in the second coating station comprises polyethene.

12. The method of claim 9, wherein just before coating in the first coating station, the strip is at a temperature between 80° C. and 120° C., and wherein the molten sheet applied in the second coating station comprises polypropene.

13. The method of claim 9, wherein just before coating in the first coating station, the strip is at a temperature between 80° C. and 110° C., and wherein the molten sheet applied in the second coating station comprises polyethene.

14. Method of coating a metallic iron-containing strip with thermoplastic coating material, comprising:

preheating the strip to have, just prior to coating in a first coating station, a temperature between 70° C. and 130° C.;

coextruding, in the first coating station, a molten sheet comprising a polyolefin top layer and a modified polyolefin adhesion layer;

coating the strip with the coextruded molten sheet in the presence of ozone by pressing the coextruded molten sheet with the adhesion layer against the surface of the strip to form a strip coated on one side with the coextruded sheet to form a coating having a thickness of 3 to 20 µm;

transporting the strip coated on one side with the coextruded sheet to a second coating station and heating the transported strip to have a temperature, before coating in the second coating station, of between 70° C. and 120° C.;

extruding in the second coating station a molten sheet comprising polyester composed of one or more layers comprising polyester;

coating the strip by pressing the extruded molten sheet against a surface of the strip to form a coating having a thickness of 3 to 20 µm;

heating the twice coated strip to a temperature which is above the melting point of the polyolefin applied;

cooling the heated, twice coated substrate.

15. The method of claim 14, wherein the strip is heated to have, just prior to coating in the second coating station, a temperature between 100° C. and 120° C., and wherein the molten layer applied in the second coating station comprises polypropene.

16. The method of claim 14, wherein just before coating in the first coating station, the strip is at a temperature between 90° C. and 120° C., and wherein the molten layer applied in the second coating station comprises polyethene.

17. The method of claim 1, wherein the molten layers applied at the first and second coating stations each comprise polyethene and polypropene.

18. The method of claim 2, wherein the molten layers applied at the first and second coating stations each comprise polyethene and polypropene.

19. The method of claim 1, wherein the ozone is concentrated between each molten sheet and the strip.

20. The method of claim 2, wherein the ozone is concentrated between each molten sheet and the strip.

21. The method of claim 19, wherein 8 mg ozone per sq. m of respective molten sheet is applied between each respective molten sheet and the strip.

22. The method of claim 20, wherein 8 mg ozone per sq. m of respective molten sheet is applied between each respective molten sheet and the strip.

23. The method of claim 1, wherein the strip is preheated to have a temperature, just prior to coating in the first coating station, between 70 and 80° C. and the coextruded molten sheet applied in the first station comprises polyethene.

24. The method of claim 2, wherein the strip is preheated to have a temperature, just prior to coating in the second coating station, between 70 and 80° C.

25. The method of claim 2, wherein the strip is preheated to have a temperature, just prior to coating in the second coating station, between 70 and 90° C.

26. The method of claim 9, wherein the strip is preheated to have a temperature, just prior to coating in the second coating station, between 70 and 80° C.

27. The method of claim 1, wherein the twice coated strip is quenched to cause the polyolefin to remain monocrystalline.

28. The method of claim 2, wherein the twice coated strip is quenched to cause the polyester to remain substantially amorphous and cause the polyolefin to remain monocrystalline.

29. The method of claim 1, wherein at least one said molten sheet comprises 5–20% by weight LDPE.

30. The method of claim 2, wherein at least one said molten sheet comprises 5–20% by weight LDPE.

* * * * *